US009445455B2

(12) United States Patent
Morita

(10) Patent No.: US 9,445,455 B2
(45) Date of Patent: Sep. 13, 2016

(54) COMMUNICATION APPARATUS AND COMMUNICATION METHOD

(71) Applicant: Panasonic Corporation, Osaka (JP)

(72) Inventor: Junichi Morita, Tokyo (JP)

(73) Assignee: Panasonic Corporation, Osaka (JP)

( * ) Notice: Subject to any disclaimer, the term of this patent is extended or adjusted under 35 U.S.C. 154(b) by 159 days.

(21) Appl. No.: 14/574,057

(22) Filed: Dec. 17, 2014

(65) Prior Publication Data
US 2015/0189545 A1 Jul. 2, 2015

(30) Foreign Application Priority Data

Dec. 27, 2013 (JP) .................................. 2013-273112
Sep. 17, 2014 (JP) .................................. 2014-188960

(51) Int. Cl.
H04W 28/02 (2009.01)
H04W 88/06 (2009.01)
H04W 40/12 (2009.01)
H04W 76/04 (2009.01)
H04W 76/02 (2009.01)
H04W 84/12 (2009.01)

(52) U.S. Cl.
CPC ........... *H04W 88/06* (2013.01); *H04W 76/025* (2013.01); *H04W 84/12* (2013.01)

(58) Field of Classification Search
CPC ........... H04W 76/025; H04W 76/027; H04W 84/12; H04W 88/06; H04W 40/12; H04L 1/243; H04L 41/00; H04L 41/06; H04B 1/005
See application file for complete search history.

(56) References Cited

U.S. PATENT DOCUMENTS 6,882,628 B2 * 4/2005 Nakagawa ............ H04W 48/18
370/252
8,654,746 B2 * 2/2014 Cordeiro ................ H04L 5/001
370/338

(Continued)

FOREIGN PATENT DOCUMENTS

JP 2008-177754 7/2008

OTHER PUBLICATIONS

IEEE Computer Society "Part11:Wireless LAN Medium Access Control(MAC)and Physical Layer(PHY) Specifications Amendment3:Enhancements for Very High Throughput in the 60 GHz Band" IEEE Std 802.11ad,Dec. 28, 2012, pp. 396-407.

Primary Examiner — Ahmed Elallam
(74) Attorney, Agent, or Firm — Seed IP Law Group PLLC

(57) ABSTRACT

A communication apparatus includes: a first communicator that communicates with another communication apparatus through a first communication path; a second communicator that communicates with the other communication apparatus through a second communication path; a communication-path monitor that monitors a condition of a communication through the first communicator; a switching-setup-packet generator that sequentially generates switching-setup packets to be transmitted through the first and second communicators, based on a determination indicating that the condition of the communication through the first communicator is bad; and a switching controller that switches between communications through the first and second communicators, based on a type of which response data for the switching-setup packets arrive from the other communication apparatus and an order in which response data for the switching setup packets arrive from the other communication apparatus.

11 Claims, 10 Drawing Sheets

(56) References Cited

U.S. PATENT DOCUMENTS

| | | | |
|---|---|---|---|
| 9,071,395 B2* | 6/2015 | Kwon | H04L 5/003 |
| 2008/0170540 A1 | 7/2008 | Fukuda | |
| 2011/0065440 A1* | 3/2011 | Kakani | H04L 1/0022 |
| | | | 455/450 |
| 2012/0120892 A1* | 5/2012 | Freda | H04W 8/005 |
| | | | 370/329 |
| 2013/0130740 A1* | 5/2013 | Saito | H04W 36/30 |
| | | | 455/552.1 |
| 2013/0308543 A1* | 11/2013 | Cordeiro | H04W 12/04 |
| | | | 370/328 |
| 2014/0192714 A1* | 7/2014 | Cordeiro | H04W 76/023 |
| | | | 370/328 |
| 2015/0016246 A1* | 1/2015 | Morita | H04W 72/02 |
| | | | 370/228 |
| 2015/0312382 A1* | 10/2015 | Gantman | H04W 36/00 |
| | | | 370/331 |
| 2016/0044711 A1* | 2/2016 | Lou | H04W 74/0816 |
| | | | 370/338 |

* cited by examiner

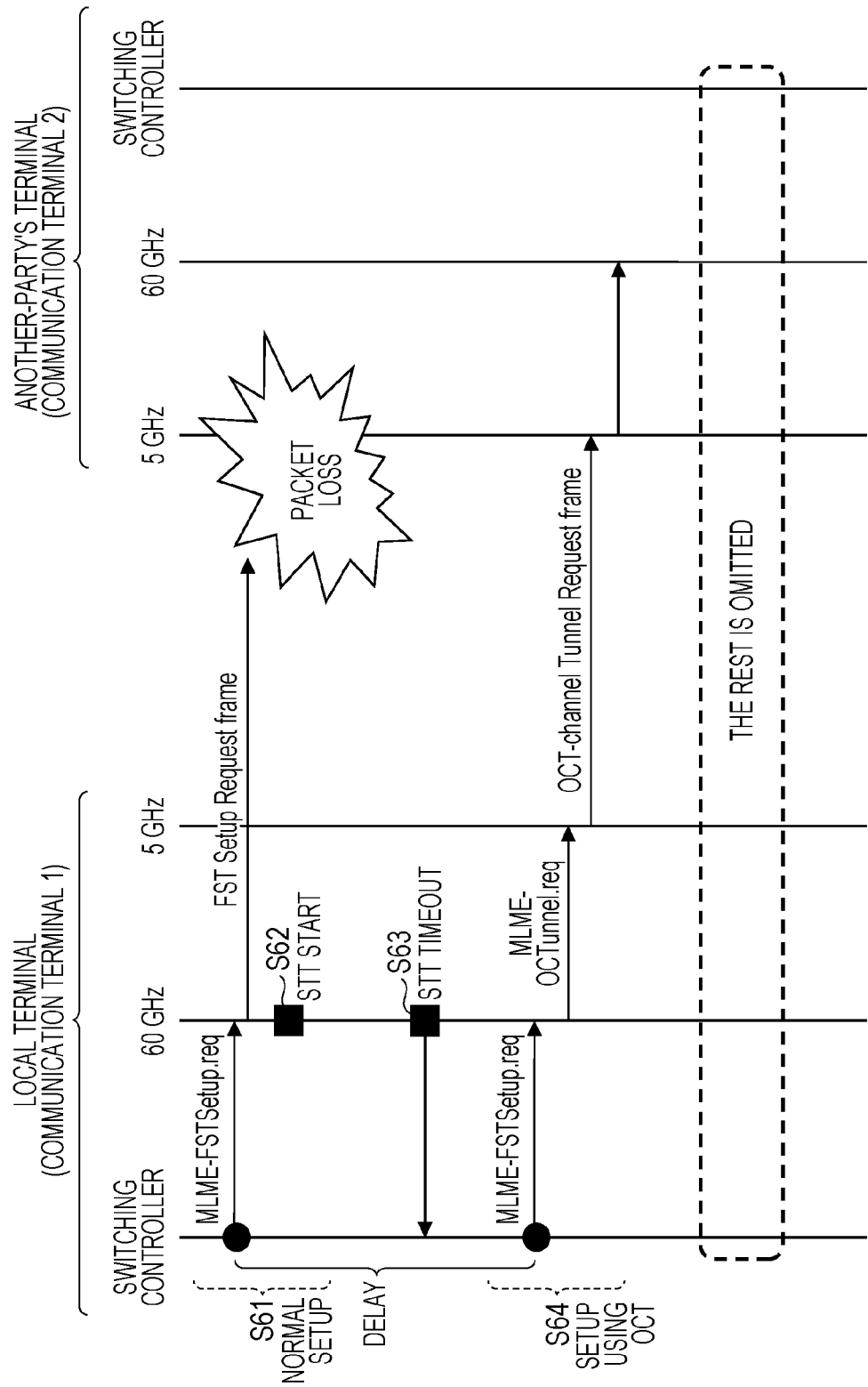

COMMUNICATION APPARATUS AND COMMUNICATION METHOD

The present application is based on and claims the benefit of Japanese Patent Application No. 2013-273112 filed in the Japan Patent Office on Dec. 27, 2013 and Japanese Patent Application No. 2014-188960 filed in the Japan Patent Office on Sep. 17, 2014, the entire contents of which are incorporated herein by reference.

BACKGROUND

1. Technical Field

The present disclosure relates to a communication apparatus and a communication method. For example, the present disclosure relates to a communication apparatus that performs communication by using a plurality of communication paths.

2. Description of the Related Art

Nowadays, with the increasing functionality of mobile terminals and the increasing densities of video content, video files with high image qualities and large-size files are also increasingly transmitted and received by mobile terminals. In such an environment, a communication terminal is generally required to transmit/receive (communicate) a large-size file to/from another party's communication terminal at high speed.

Short-range wireless communication using a millimeter wave band (hereinafter referred to as "millimeter wave communication") has attracted attention as a method for high-speed communication. Millimeter wave communication is a communication method that can realize gigabit throughput or higher. For communication between mobile terminals, millimeter wave communication is also expected to play a role of replacing infrared communication or reducing traffic in public communication networks.

In IEEE802.11ad (60 GHz), which is a Wireless Fidelity (WiFi) standard for millimeter wave communication, Fast Session Transfer (FST) has been standardized. FST is a system that performs seamless switching on the order of milliseconds between a millimeter wave communication and a wireless local area network (LAN) (5 GHz/2.4 GHz) communication (i.e., switching of a communication using 60 GHz to a communication using 5 GHz/2.4 GHz or switching from a communication using 5 GHz/2.4 GHz to a communication using 60 GHz). FST has attracted attention as a standard for compensating for high-speed communication, which is a feature of the millimeter wave communication (see, for example, "Part 11: Wireless LAN Medium Access Control (MAC) and Physical Layer (PHY) Specifications Amendment 3: Enhancements for Very High Throughput in the 60 GHz Band", IEEE Computer Society IEEE Std 802.11ad, Dec. 28, 2012, P396-P407 (this document is referred to as "Non-Patent Document 1" hereinafter).

As a system for transmitting a plurality of control packets between two communication apparatuses, a communication system as described below is known (see, for example, Japanese Unexamined Patent Application Publication No. 2008-177754 (hereinafter referred to as Patent Document 1)).

The communication system disclosed in Patent Document 1 has two transmission paths between first and second terminal stations and a base station. The two transmission paths are constituted by a wireless communication path (a transmission path A) and a communication path (a transmission path B) using a power line. By using the two transmission paths, the first terminal station or the second terminal station and the base station transmit data packets therebetween in a downlink direction and transmit control packets in an uplink direction. The downlink direction is a direction from the base station to the first or second terminal station. The uplink direction is a direction from the first or second terminal stations to the base station.

Patent Document 1 discloses two transmission modes, that is, a high-speed transmission mode and a high-quality transmission mode. The high-speed transmission mode is a mode in which transmission packets (data packets) are distributed to the two transmission paths, and is used for transmission in the downlink direction. The high-quality transmission mode is a mode in which even when the quality of communication in one of the transmission paths is poor, the other transmission path is used to complement the communication. The high-quality transmission mode is mainly used in the uplink direction.

In the technology disclosed in Patent Document 1 or Non-Patent Document 1 do not sufficiently consider a communication situation at 60 GHz for switching of the communication path. Consequently, the accuracy of switching the communication path is insufficient.

SUMMARY

One non-limiting and exemplary embodiment provides a communication apparatus that can improve the accuracy of switching a communication path.

A communication apparatus according to the present disclosure includes: a first communicator that communicates with another communication apparatus through a first communication path; a second communicator that communicates with the other communication apparatus through a second communication path; a communication-path monitor that monitors a condition of a communication through the first communicator; a switching-setup-packet generator that sequentially generates switching-setup packets to be transmitted through the first communicator and the second communicator, when packet loss occurs in the communication through the first communicator; and a switching controller that controls a switching control between the communication through the first communicator and a communication through the second communicator, based on a type of which response data for the switching-setup packets arrive from the other communication apparatus and an order in which the response data for the switching setup packets arrive from the other communication apparatus.

These general and specific aspects may be implemented using a system, a method, and a computer program, and any combination of systems, methods, and computer programs.

According to the present disclosure, it is possible to improve the accuracy of switching a communication path.

DETAILED DESCRIPTION

Figure 9:
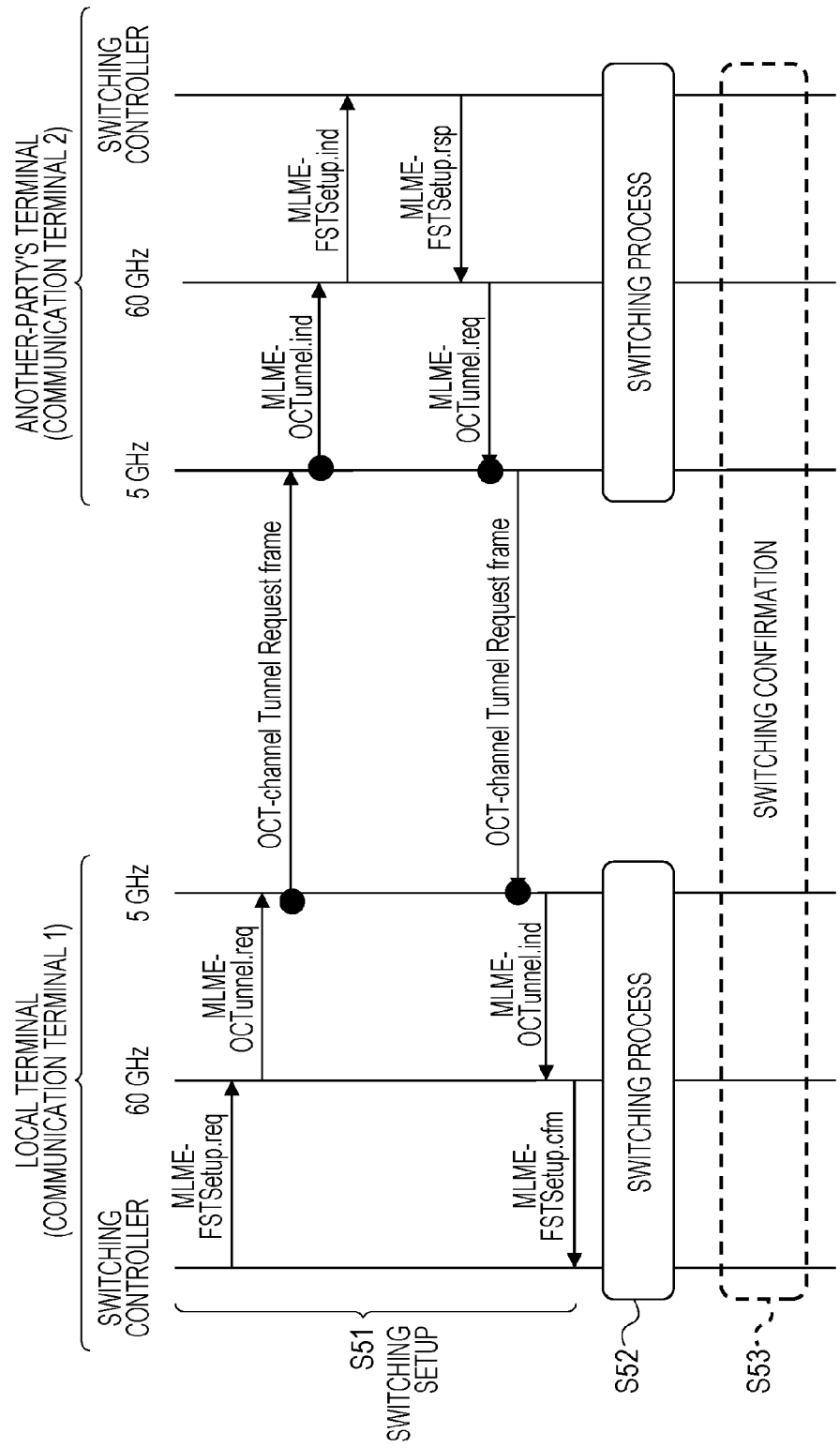

FIG. 9 is a sequence diagram illustrating an operation for switching the frequency band from 60 GHz to 5 GHz through FST using OCT defined in IEEE802.11ad; and FIG. 10 is a sequence diagram illustrating an operation that is assumed to be performed during switching of the frequency band from 60 GHz to 5 GHz as a result of a bad condition of a communication using 60 GHz.

DESCRIPTION OF THE PREFERRED EMBODIMENTS

An embodiment of the present disclosure will be described below with reference to the accompanying drawings.

(Background that LED to Technology According to Present Disclosure)

In order for millimeter wave communication to be in widespread use in the future, it needs to coexist with wireless local area networks (LANs) that are widely used today. For terminals (e.g., mobile terminals) having millimeter wave communication functions, terminals having both a communication function for millimeter wave communication and a communication function for wireless LAN communication are thought to be widely used.

Compared with the currently available wireless LAN communication, the millimeter wave communication has features in its short communication distance and strong directivity, while having a high-speed communication capability. That is, compared with the currently available wireless LAN communication, the millimeter wave communication is large in changes in throughput during communication, and thus communication sessions are easily disconnected. Thus, terminals that support millimeter wave communication have a function for millimeter wave communication and wireless LAN communication (e.g., a function for seamless switching between the communications) to cooperate with each other during communication.

Figure 8:
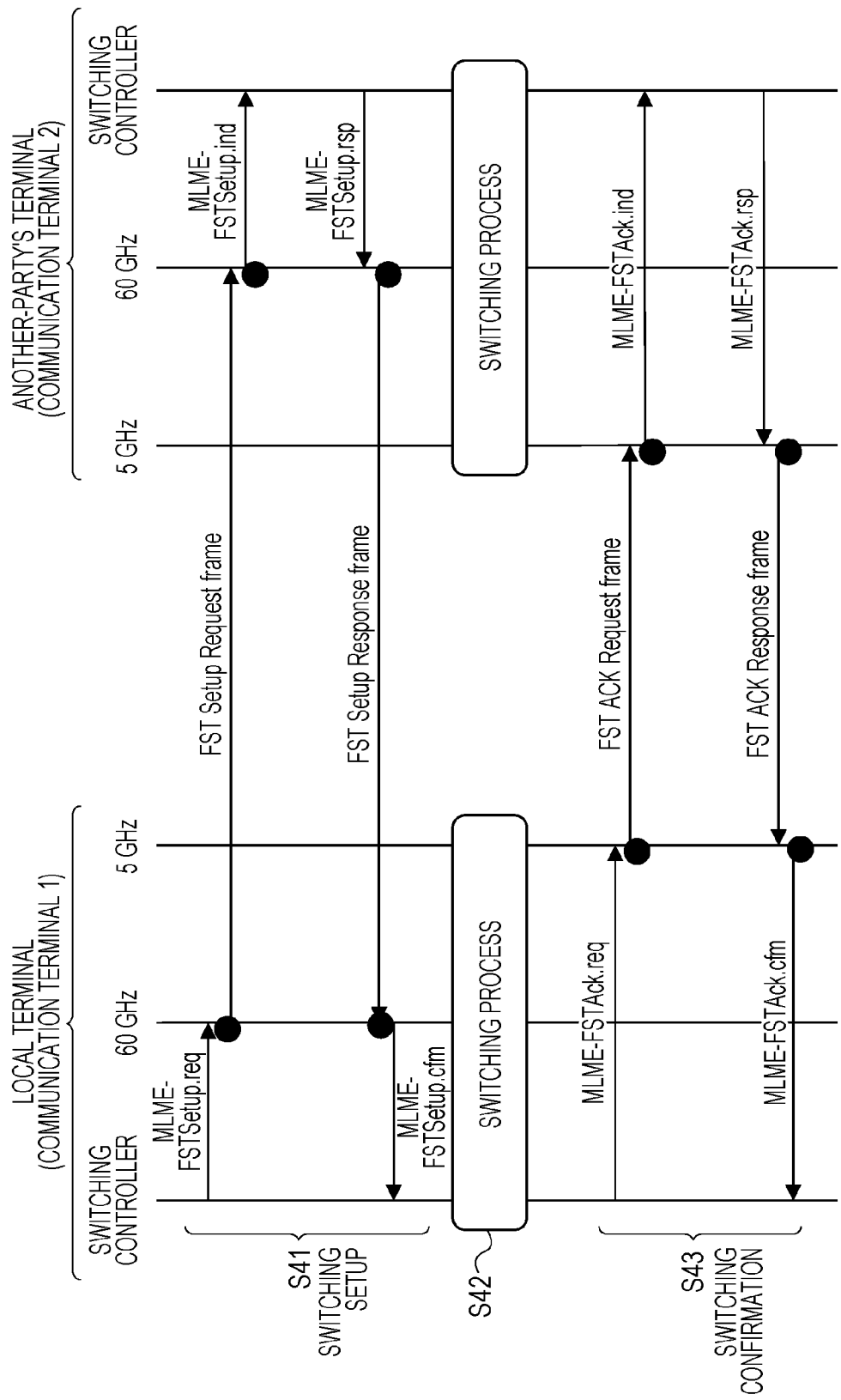
FIG. 8 is a sequence diagram illustrating an operation for switching the frequency band from 60 GHz to 5 GHz by using FST defined in IEEE802.11ad.

FIG. 8 is a sequence diagram illustrating an operation for switching the frequency band from 60 GHz to 5 GHz by using FST defined in IEEE802.11ad. That is, FIG. 8 is a schematic diagram illustrating a control sequence of FST defined in IEEE802.11ad, which performs a switching between a communication path for millimeter wave communication and a communication path for wireless LAN communication. FST is a system used for seamless switching control in milliseconds between a millimeter wave communication and a wireless LAN communication. FIG. 8 is a control sequence for switching from a communication path for millimeter wave communication to a communication path for wireless LAN communication, that is, for switching the frequency band from 60 GHz to 5 GHz. The switching control includes three steps: switching setup, a switching process, and switching confirmation.

In FIG. 8, communication terminals 1 and 2 mutually exchange switching-setup packets (S41) by using the frequency band (e.g., 60 GHz) from which the switching is to be performed (i.e., the frequency band before the switching). The communication terminals 1 and 2 perform corresponding switching processes (S42), and then exchange switching confirmation packets (S43) by using the frequency band (e.g., 5 GHz) to which the switching is to be performed (i.e., the frequency band after the switching). In the switching processes, the communication path is switched. Each switching-setup packet is a packet for requesting start of the switching process. Each switching confirmation packet is a packet for querying whether or not the switching process in the other party's terminal is successfully completed.

For high-speed transfer between the communication terminals 1 and 2 that support both of the frequency bands of 60 GHz and 5 GHz, they use 60 GHz, which allows higher speed communication, to communicate with each other, and continue the communication by using 5 GHz upon determining that the condition of the communication at 60 GHz becomes bad. However, when the condition of the communication using 60 GHz is already bad at a timing at which the communication terminals 1 and 2 determine that the frequency band is to be switched (i.e., at a timing at which the switching-setup packets are transmitted), it is difficult for the communication terminals 1 and 2 to exchange the switching-setup packets, and the switching processes are not executed. Thus, the communication using 60 GHz continues, and consequently, packet loss occurs. The switching of the frequency band corresponds to switching of the communication path.

For IEEE802.11ad, the communication terminals 1 and 2 may use on-channel tunneling (OCT) as measures for a situation in which it is difficult to perform frequency switching. OCT is one scheme on a standard which uses, before a switching process, the frequency band to which the switching is to be performed to exchange switching-setup packets, instead of using the frequency band from which the switching is to be performed.

FIG. 9 is a sequence diagram illustrating an operation for switching the frequency band from 60 GHz to 5 GHz through FST using OCT defined in IEEE802.11ad. That is, FIG. 9 is a schematic diagram illustrating a sequence for a frequency band (communication path) switching through FST utilizing OCT. In FIG. 8, the frequency band (e.g., 60 GHz) from which the switching is to be performed is used to exchange the switching-setup packets, as described above. In FIG. 9, by utilizing OCT and using the frequency band (e.g., 5 GHz) to which the switching is to be performed, a switching controller 15 (described below) exchanges the switching-setup packets (S51), before the switching process. The switching processes (S52 and S53) and subsequent processes in FIG. 9 are substantially the same as the switching processes (S42 and S43) and the subsequent processes in FIG. 8. By utilizing OCT, the switching controller 15 can use the frequency band (e.g., 5 GHz) to which the switching is to be performed, to perform packet exchange, before the switching process.

FIG. 10 is a sequence diagram illustrating an operation that is assumed to be performed during switching of the frequency band from 60 GHz to 5 GHz as a result of a bad condition of a communication using 60 GHz. That is, FIG. 10 is a schematic diagram illustrating a control sequence for switching a communication from 60 GHz to 5 GHz when the condition of the communication using 60 GHz becomes bad. FIG. 10 illustrates a sequence based on FIGS. 8 and 9.

In FIG. 10, the communication terminal 1 transmits a switching-setup packet to the communication terminal 2 (S61) by using the frequency band (e.g., 60 GHz) from which the switching is to be performed. However, the communication terminal 1 does not receive, from the communication terminal 2, a response to the switching-setup packet within a state transition timer (STT) period (S62 and S63). Thus, before the switching process, the communication terminal 1 uses OCT to re-transmit the switching-setup packet to the communication terminal 2 (S64) by using the frequency band (e.g., 5 GHz) to which the switching is to be performed.

However, in FIG. 10, the communication terminal 1 adds a delay corresponding to the STT period until it transmits the switching-setup packet by using FST. Although the value of the STT is not defined in IEEE802.11ad, the value of the STT in typical implementations is a value in units of seconds. Consequently, it is difficult to switch the communication path at high speed on the order of milliseconds.

Accordingly, it is conceivable to transmit the switching-setup packets in the same period of time or serially by using the frequency band (60 GHz) from which the switching is to be performed and the frequency band (5 GHz) to which the switching is to be performed. For example, Patent Document 1 discloses a technology for transmitting control packets including switching-setup packets in the same period of time.

In Patent Document 1, the high-quality transmission mode corresponds to the technology for transmitting control packets in the same period of time, but Patent Document 1 discloses processing for control packets in only one direction. That is, what is described in Patent Document 1 is that, even when the communication quality of one of the transmission paths A and B is bad, complement is possible using the other transmission path A or B, since the packets are transmitted through both the transmission path A and the transmission path B in the same period of time. What is also described is that, when packets are received through both of the transmission paths A and B, both of the packets are combined or a packet that has been received through the transmission path whose communication quality is higher is selected.

However, no consideration has been given to bidirectional arrival orders, that is, a first arrival order in which switching-setup packets arrive at the communication terminal 2 and a second arrival order in which response packets for the switching-setup packets arrive at the communication terminal 2. Thus, even when the technology disclosed in Patent Document 1 is applied to communication path switching using FST, it is difficult to appropriately switch the transmission path.

The description below is given of a communication apparatus and a communication method that can improve the accuracy of switching a communication path.

Embodiment

Figure 1:
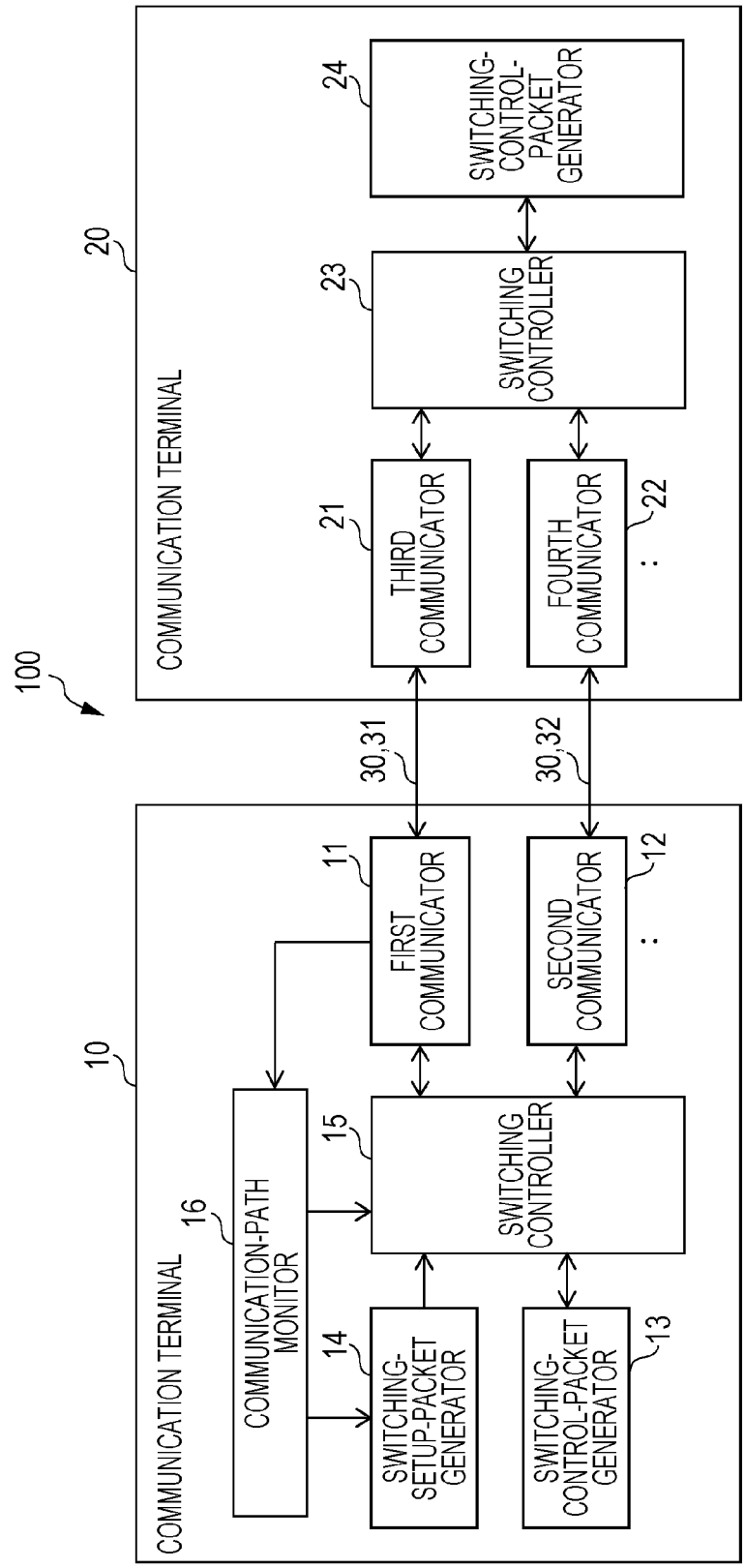
FIG. 1 is a block diagram illustrating an example configuration of a communication system according to an embodiment.

FIG. 1 is a block diagram illustrating an example configuration of a communication system 100 and example configurations of communication terminals 10 and 20 in an embodiment. The communication system 100 includes the communication terminals 10 and 20. The communication terminal 10 and the communication terminal 20 are connected to each other through communication paths 30. The communication paths 30 include, for example, a first communication path 31 and a second communication path 32. The number of communication paths included in the communication paths 30 may be three or more.

The communication terminals 10 and 20 are applied to, for example, communication terminals that transfer files or that perform data streaming. The communication terminals 10 and 20 are, for example, mobile phones, smartphones, personal computers (PCs), or tablet terminals. The communication terminals 10 and 20 may also be communication apparatuses (e.g., communication servers) other than such communication terminals.

Communication signals that comply with a millimeter wave communication system or another communication system are transmitted through the first communication path 31. Communication signals that comply with a wireless LAN communication system or another communication system are transmitted through the second communication path 32. As long as communication signals whose communication characteristics are variable more easily than those of communication signals transmitted through the second communication path 32 are transmitted through the first communication path 31, the frequency bands used for communication are not particularly limited. The millimeter wave communication uses, for example, a frequency band of 60 GHz. The wireless LAN communication complies with, for example, the IEEE802.11n standard and uses a frequency band of 5 GHz or 2.4 GHz.

In the first communication path 31, for example, the maximum throughput is on the order of gigabits (e.g., 2 Gbps), but communication is easily interrupted. In the second communication path 32, communication at about 100 Mbps can be performed stably.

The communication terminal 10 includes a first communicator 11, a second communicator 12, a switching-control-packet generator 13, a switching-setup-packet generator 14, the switching controller 15 noted above, and a communication-path monitor 16.

The first communicator 11 communicates data with the communication terminal 20 through the first communication path 31. The second communicator 12 communicates data with the communication terminal 20 through the second communication path 32.

The switching-control-packet generator 13 generates a switching-control packet for switching a communication path from the first communication path 31 to the second communication path 32 or from the second communication path 32 to the first communication path 31. The switching of the communication path from the first communication path 31 to the second communication path 32 corresponds to switching of the communicator from the first communicator 11 to the second communicator 12. The switching of the communication path from the second communication path 32 to the first communication path 31 corresponds to switching of the communicator from the second communicator 12 to the first communicator 11. The switching controller 15 handles protocols including, for example, FST.

Examples of the switching-control packets include a switching-setup packet, a response packet for a switching-setup packet, a, switching confirmation packet, an acknowledgement response packet for a switching confirmation packet, and a session-disconnect packet. The session-disconnect packet is a packet for requesting disconnection of a communication session. The switching-setup-packet generator 14 generates the switching-setup packet.

In order to switch communication path in accordance with a determination made by the communication-path monitor 16, the switching-setup-packet generator 14 generates switching-setup packets sequentially (e.g., continuously, at substantially the same time (in the same period of time), or within a predetermined time) through each of the first communicator 11 and the second communicator 12. The "substantially the same time" refers to a state in the transmission times of the switching-setup packets partly overlap each other.

For example, when the communication-path monitor 16 determines that the condition of the first communication path 31 is bad on the basis of FST, the switching controller 15 controls switching of the communication path (the communicator) on the basis of a first arrival order and a second arrival order. The first arrival order is the order in which two switching-setup packets generated by the switching-setup-packet generator 14 arrive at the communication terminal 20. The second arrival order is the order in which two response packets for the switching-setup packets arrive from the communication terminal 20. That is, the switching controller 15 performs switching control on the communication path on the basis of the bidirectional arrival orders between the communication terminal 10 and the communication terminal 20.

The switching control performed by the switching controller 15 includes both communication of various switching-control packets and a switching process for actually performing communication path switching.

The communication-path monitor 16 uses, for example, a monitoring parameter to sequentially monitor the communication condition of the first communication path 31. The monitoring parameter includes, for example, the value of a received signal strength indication (RSSI), the value of a signal-to-noise ratio (S/N ratio), or the value of actual throughput at the application level. The communication-path monitor 16 monitors an increase/decrease in the value of the monitoring parameter. In the present embodiment, a monitoring method is not particularly limited.

The communication terminal 20 includes a third communicator 21, a fourth communicator 22, a switching controller 23, and a switching-control-packet generator 24.

The third communicator 21 communicates data with the communication terminal 10 through the first communication path 31. The fourth communicator 22 communicates data with the communication terminal 10 through the second communication path 32.

The switching-control-packet generator 24 generates a switching-control packet for switching the communication path from the first communication path 31 to the second communication path 32 or from the second communication path 32 to the first communication path 31.

The switching of the communication path from the first communication path 31 to the second communication path 32 corresponds to switching of the communicator from the third communicator 21 to the fourth communicator 22. The switching of the communication path from the second communication path 32 to the first communication path 31 corresponds to switching of the communicator from the fourth communicator 22 to the third communicator 21. The switching controller 23 handles protocols including, for example, FST.

In response to the switching-setup packet and the switching confirmation packet received through the first communication path 31 or the second communication path 32, the switching controller 23 transmits a normal response (reception success) or a reject response (reception failure) in accordance with a reception state at the communication terminal 20.

Next, a description will be given of example operations of the communication terminals 10 and 20.

Figure 2:
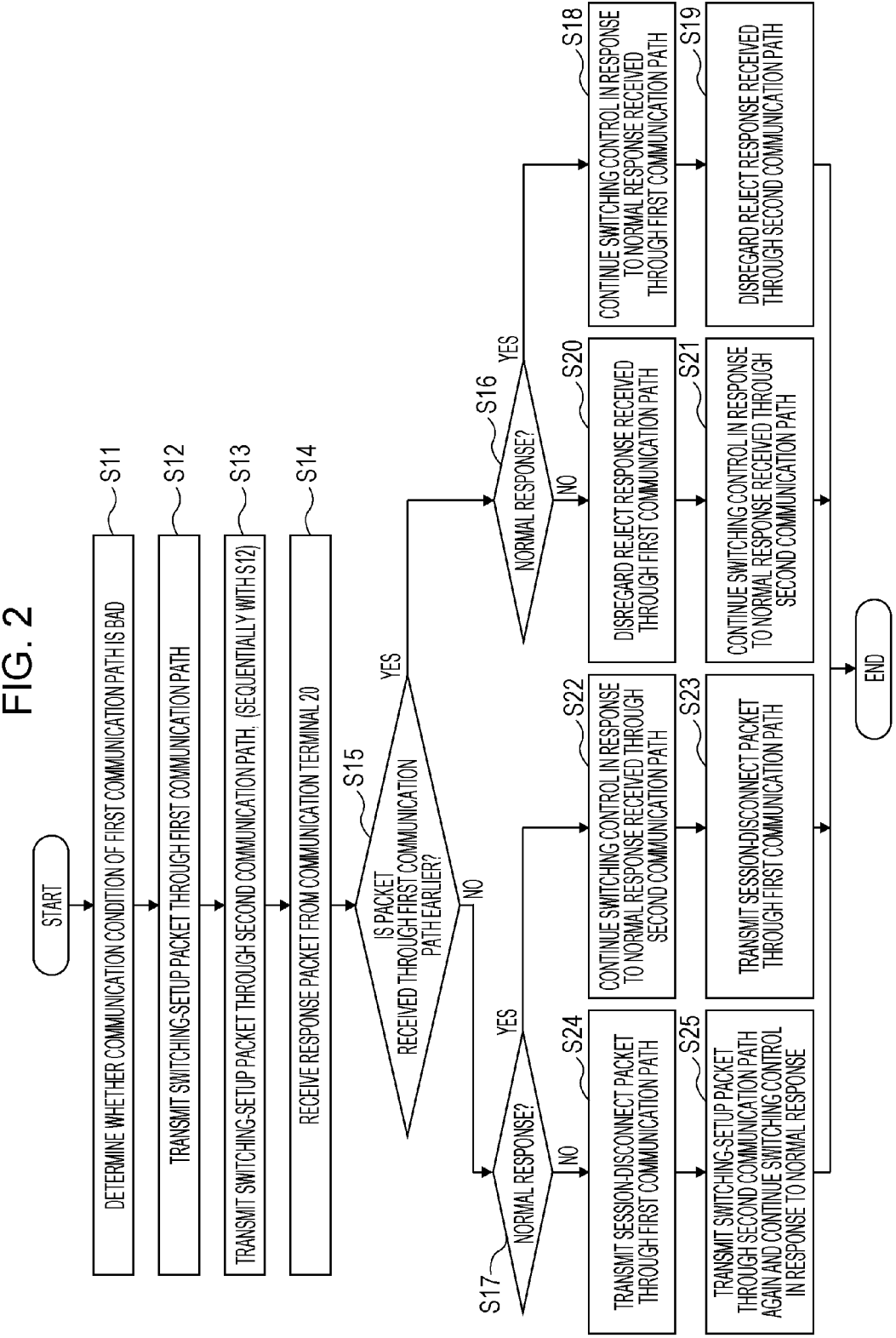
FIG. 2 is a flowchart illustrating an example operation of a communication terminal (a transmission terminal)

FIG. 2 is a flowchart illustrating an example operation of the communication terminal 10. FIG. 2 illustrates communication path switching from the first communication path 31 to the second communication path 32 during data communication between the communication terminal 10 and the communication terminal 20 through the first communication path 31.

First, for example, by using the monitoring parameter, the communication-path monitor 16 determines whether or not the communication condition of the first communication path 31 is bad (S11). The "bad communication condition" as used herein refers to a state in which it is determined that the throughput of the first communication path 31 has decreased to a level that is lower than the throughput of the second communication path 32.

In response to a determination indicating that the communication condition of the first communication path 31 is bad, the switching-setup-packet generator 14 generates a switching-setup packet, and the switching controller 15 uses FST to transmit the generated switching-setup packet through the first communication path 31 (S12). The switching-setup packet includes, for example, an FST Setup Request frame.

In response to the determination indicating that the communication condition of the first communication path 31 is bad, the switching-setup-packet generator 14 generates a switching-setup packet, and the switching controller 15 uses OCT to transmit the switching-setup packet through the second communication path 32 (S13). The switching-setup packet includes, for example, an OCT-Channel Tunnel Request frame.

The first communicator 11 or the second communicator 12 receives, from the communication terminal 20 through the first communication path 31 or the second communication path 32, a response packet for the switching-setup packet and reports the response packet to the switching controller 15 (S14). The response packet includes, for example, an FST Setup Response frame.

The switching controller 15 determines whether a response packet reported earlier is a packet received through the first communication path 31 or a packet received through the second communication path 32 (S15). The response packet reported earlier does not always indicate a normal response, and a response packet reported later may indicate a normal response.

Upon determining in step S15 that the response packet reported earlier is a packet received through the first communication path 31, the switching controller 15 determines whether the response packet indicates a normal response or a reject response (S16).

The communication terminal 20 transmits a normal response to the communication path 31 or 32 through which the switching-setup packet arrived at the communication terminal 20 earlier. For example, when the response packet received through the first communication path 31 indicates a normal response, this means that the switching-setup packet transmitted from the communication terminal 10 to the communication terminal 20 (in a forward path) through the first communication path 31 arrived earlier. Also, when the response packet received through the second communication path 32 indicates a normal response, this means that the switching-setup packet transmitted from the communication terminal 10 to the communication terminal 20 (in the forward path) through the second communication path 32 arrived earlier. That is, a normal response is issued for the communication path through which the communication terminal 20 has received the switching-setup packet earlier.

The communication terminal 20 transmits a reject response to the communication path through which the switching-setup packet arrived at the communication terminal 20 later. For example, when the response packet received through the first communication path 31 indicates a reject response, this means that the switching-setup packet transmitted from the communication terminal 10 to the communication terminal 20 (in the forward path) through the first communication path 31 arrived later. When the response packet received through the second communication path 32 indicates a reject response, this means that the switching-setup packet transmitted from the communication terminal 10 to the communication terminal 20 (in the forward path) through the second communication path 32 arrived later. That is, a reject response is issued for the communication path through which the communication terminal 20 has received the switching-setup packet later.

Upon determining in step S16 that the response packet received through the first communication path indicates a normal response, the switching controller 15 continues the switching control in response to the response packet, i.e., the normal response received through the first communication path 31 (S18).

In the switching control in step S18, for example, the switching controller 15 switches (performs a switching process for switching), in the communication terminal 10, the communicator from the first communicator 11 to the second communicator 12. Also, in the switching control in step S18, for example, the switching controller 15 transmits a switching confirmation packet generated by the switching-control-packet generator 13 to the communication terminal 20 through the second communication path 32, waits for an acknowledgement response packet for the switching confirmation packet, and completes the communication path switching. The switching confirmation packet includes, for example, an FST Ack Request frame.

The switching controller 15 omits the switching control in response to a response packet that serves as a reject response and that arrives through the second communication path 32, subsequent to the normal response received through the first communication path 31 (S19). This is because the normal response has already been received from the communication terminal 20.

In a first control pattern involving steps S15, S16, and S18, the switching-setup packet transmitted from the communication terminal 10 through the first communication path 31 arrives at the communication terminal 20 earlier, and the switching-setup packet transmitted from the communication terminal 10 through the second communication path 32 arrives at the communication terminal 20 later. Also, the communication terminal 10 receives the response packet through the first communication path 31 earlier and receives the response packet through the second communication path 32 later.

That is, in the first control pattern, a communication through the first communication path 31 is reported earlier in both the transmission of the switching-setup packet by the communication terminal 10 and the reception of the response packet from the communication terminal 20.

Next, upon determining in step S16 that the response packet received through the first communication path indicates a reject response, the switching controller 15 omits the switching control in response to the reported response packet, that is, the reject response received through the first communication path 31 (S20). The switching controller 15 continues the switching control in response to a normal response that arrives through the second communication path 32, subsequent to the reject response received through the first communication path 31 (S21).

This is because the switching-control packet transmitted from the communication terminal 10 (in the forward path) through the second communication path 32 is reported to the communication terminal 20 earlier.

In the switching control in step S21, for example, the switching controller 15 switches (performs a switching process for switching), in the communication terminal 10, the communicator from the first communicator 11 to the second communicator 12. Also, in the switching control in step S21, for example, the switching controller 15 transmits a switching confirmation packet generated by the switching-control-packet generator 13 to the communication terminal 20 through the second communication path 32, waits for an acknowledgement response packet for the switching confirmation packet, and completes the communication path switching.

In a second control pattern involving steps S15, S16, and S20, the switching-setup packet transmitted from the communication terminal 10 through the second communication path 32 arrives at the communication terminal 20 earlier, and the switching-setup packet transmitted from the communication terminal 10 through the first communication path 31 arrives at the communication terminal 20 later. Also, the communication terminal 10 receives the response packet through the first communication path 31 earlier and receives the response packet through the second communication path 32 later.

That is, in the second control pattern, in the transmission (in the forward path) of the switching-setup packet by the communication terminal 10, a communication through the second communication path 32 is reported earlier, and in the reception (in a return path) of the response packet from the communication terminal 20, a communication through the first communication path 31 is reported earlier.

The second control pattern is executed, for example, when the condition of the first communication path 31 becomes bad during the transmission (in the forward path) of the switching-setup packet by the communication terminal 20 and the condition of the first communication path 31 is restored during the transmission (in the return path) of the response packet by the communication terminal 10.

In step S21, subsequent to the reject response received through the first communication path 31, the switching controller 15 may suspend the switching control in response to the normal response received through the second communication path 32. Since the communication path is not switched from the first communication path 31 to the second communication path 32, it is possible to continue a high-speed communication through the first communication path 31 whose condition has been restored.

Next, upon determining in step S15 that the response packet reported earlier is a packet received through the second communication path 32, the switching controller 15 determines whether the response packet indicates a normal response or a reject response (S17).

Upon determining in step S17 that the response packet reported earlier indicates a normal response, the switching controller 15 continues the switching control in response to the response packet, that is, the normal response received through the second communication path 32 (S22). That is, in the third control pattern, a communication through the second communication path 32 is reported earlier in both the transmission (in the forward path) of the switching-setup packet by the communication terminal 10 and the reception (in the return path) of the response packet from the communication terminal 20.

In the switching control in step S22, for example, the switching controller 15 switches (performs a switching process for switching), in the communication terminal 10, the communicator from the first communicator 11 to the second communicator 12. Also, in the switching control in step S22, for example, the switching controller 15 transmits a switching confirmation packet generated by the switching-control-packet generator 13 to the communication terminal 20 through the second communication path 32, waits for an acknowledgement response packet for the switching confirmation packet, and completes the communication path switching.

The switching controller 15 transmits a session-disconnect packet to the communication terminal 20 through the first communication path 31 to suspend the communication path switching currently being performed through the first communication path 31 (S23). The session-disconnect packet includes, for example, an FST TearDown Request frame.

The process in step S23 may also be omitted. When the process in step S23 is omitted, a session through the first communication path 31 is disconnected because of timeout after a predetermined time passes. By performing the process in step S23, the communication terminal 10 can quickly switch the communication path to the second communication path 32 to allow stable communication.

In the third control pattern involving steps S15, S17, and S22, the switching-setup packet transmitted from the communication terminal 10 through the second communication path 32 arrives at the communication terminal 20 earlier, and the switching-setup packet transmitted from the communication terminal 10 through the first communication path 31 arrives at the communication terminal 20 later. Also, the communication terminal 10 receives the response packet through the second communication path 32 earlier.

The third control pattern is executed, for example, when the condition of the first communication path 31 becomes bad during the transmission of the switching-setup packet from the communication terminal 10 to the communication terminal 20 (in the forward path) through the first communication path 31 and is not restored until the transmission of the response packet from the communication terminal 20 to the communication terminal 10 (in the return path) through the first communication path 31.

Next, upon determining in step S17 that the response packet reported earlier indicates a reject response, the switching controller 15 transmits a session-disconnect packet generated by the switching-control-packet generator 13 to the communication terminal 20 through the first communication path 31 to thereby suspend to switch the communication path through the first communication path 31 (S24).

Since the reject response transmitted through the second communication path 32 was reported earlier, the communication terminal 10 determines that the communication through the first communication path 31 is active but is in a state in which the possibility that a normal response through the first communication path 31 does not arrive is high. Thus, the communication terminal 10 suspends the communication made through the first communication path 31 and re-transmits the switching-setup packet through the second communication path 32 (S25).

The communication terminal 10 may also re-transmit the switching-setup packet through the second communication path 32 after waiting for a normal response through the first communication path 31 for a predetermined amount of time. When the normal response through the first communication path 31 is reported in the predetermined amount of time, the switching controller 15 continues the switching control through the first communication path 31 (S25).

Also, the switching controller 15 may re-transmit the switching-setup packet to the communication terminal 20 through the second communication path 32 by using OCT, wait for a normal response to the switching-setup packet, and continue the switching control (S25). When a reject response is returned in response to the re-transmitted switching-setup packet, the switching controller 15 repeats the transmission of the session-disconnect packet through the first communication path 31 and the transmission of the switching-setup packet through the second communication path 32 by using OCT until a normal response is returned.

In a fourth control pattern involving steps S15, S17, and S24, the switching-setup packet transmitted from the communication terminal 10 through the first communication path 31 arrives at the communication terminal 20 earlier, and the switching-setup packet transmitted from the communication terminal 10 through the second communication path 32 arrives at the communication terminal 20 later. The communication terminal 10 also receives the response packet through the second communication path 32 earlier.

That is, in the fourth control pattern, in the transmission (in the forward path) of the switching-setup packet by the communication terminal 10, a communication through the first communication path 31 is reported earlier, and in the reception (in the return path) of the response packet from the communication terminal 20, a communication through the second communication path 32 is reported earlier.

The fourth control pattern is executed, for example, when the first communication path 31 is in good condition during the transmission of the switching-setup packet from the communication terminal 10 to the communication terminal 20 (in the forward path) and the first communication path 31 during the transmission of the response packet from the communication terminal 20 to the communication terminal 10 (in the return path) is in bad condition.

According to the example operation illustrated in FIG. 2, since desired switching processes are performed based on the order in which the switching-setup packets arrive at the communication terminal 20 and the order in which the response packets arrive at the communication terminal 10, it is possible to improve the accuracy of switching between the first communication path 31 and the second communication path 32.

Figure 3:
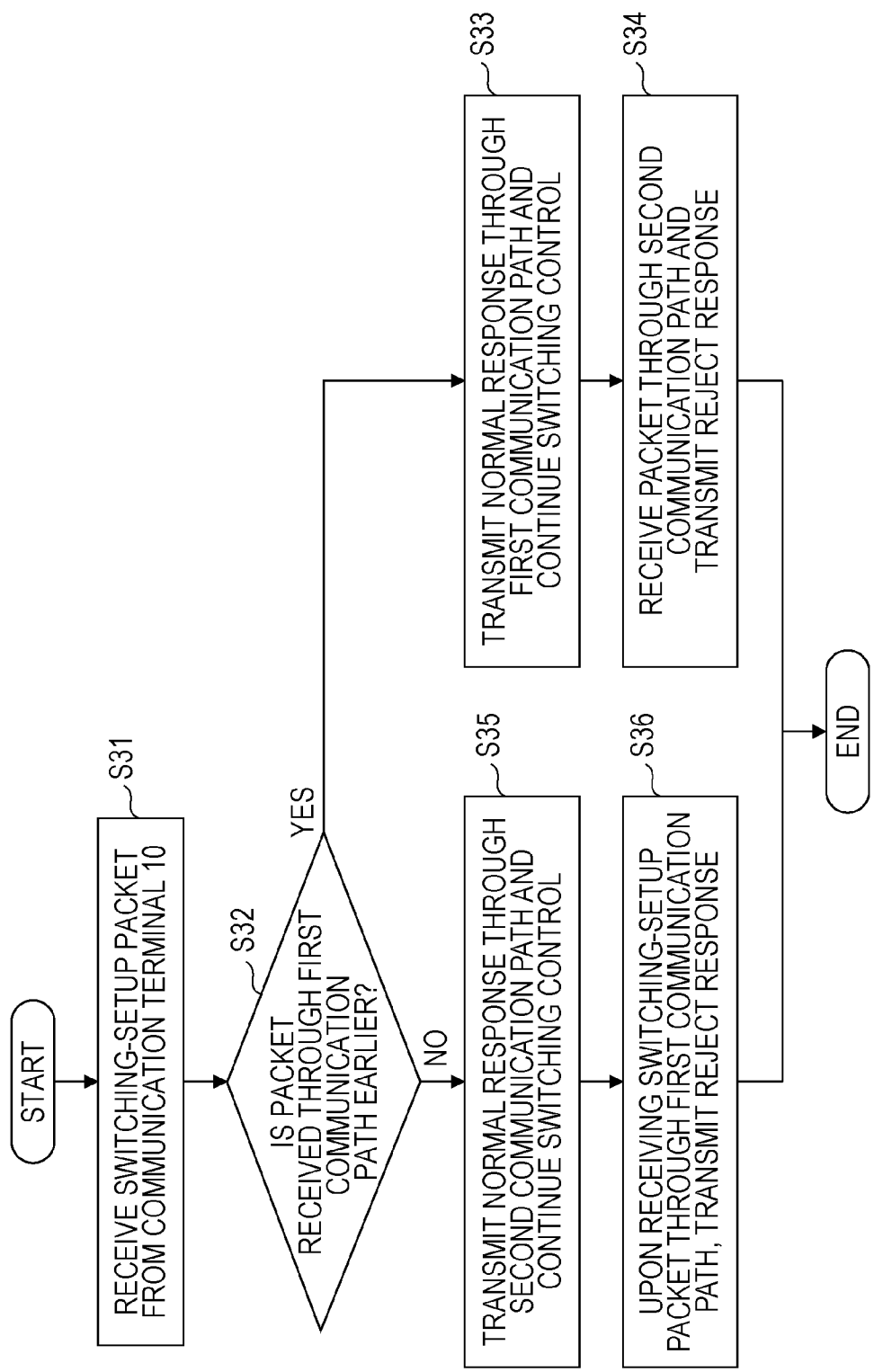
FIG. 3 is a flowchart illustrating an operation example of a communication terminal (a reception terminal)

FIG. 3 is a flowchart illustrating an operation example of the communication terminal 20. FIG. 3 illustrates switching of the communication path from the first communication path 31 to the second communication path 32 during data communication between the communication terminal 20 and the communication terminal 10 through the first communication path 31.

First, the third communicator 21 receives a switching-setup packet from the communication terminal 10 through the first communication path 31, or the fourth communicator 22 receives a switching-setup packet from the communication terminal 10 through the second communication path 32 (S31). The switching-setup packet includes, for example, an FST Setup Request frame.

The switching controller 23 determines whether the switching-setup packet is a packet received through the first communication path 31 or a packet received through the second communication path 32 (S32).

Upon determining in step S32 that the switching-setup packet is a packet received through the first communication path 31, the switching controller 23 transmits a normal response as a response packet for the switching-setup packet through the first communication path 31 and continues the switching control (S33). The response packet includes, for example, an FST Setup Response frame and is generated by the switching-control-packet generator 24.

In the switching control in step S33, the switching controller 23 switches (performs a switching process for switching), in the communication terminal 20, the communicator from the third communicator 21 to the fourth communicator 22. In the switching control in step S33, the switching controller 23 transmits an acknowledgement response packet for the switching confirmation packet received from the communication terminal 10 through the second communication path 32 and completes the communication path switching. The acknowledgement response packet includes an FST Ack Response frame and is generated by the switching-control-packet generator 24.

Since the switching controller 23 receives a switching-setup packet through the second communication path 32 after receiving the packet through the first communication path 31, the switching controller 23 transmits a reject response as a response packet for the switching-setup packet (S34).

Upon determining in step S32 that the switching-setup packet is a packet received through the second communication path 32, the switching controller 23 transmits a response packet for the switching-setup packet through the second communication path 32 by using OCT and continues the switching control (S35). The response packet includes, for example, an OCT-Channel Tunnel Request frame and is generated by the switching-control-packet generator 24.

In the switching control in step S35, for example, the switching controller 23 switches (performs a switching process for switching), in the communication terminal 20, the communicator from the third communicator 21 to the fourth communicator 22. In the switching control in step S35, the switching controller 23 transmits an acknowledgement response packet for the switching confirmation packet received from the communication terminal 10 through the second communication path 32 and completes the communication path switching. The acknowledgement response packet includes, for example, an FST Ack Response frame.

Since the forth communicator 22 receives a switching-setup packet through the first communication path 31 after the switching-setup packet is received through the second communication path 32, the switching controller 23 transmits a reject response, generated by the switching-control-packet generator 24, as a response packet for the switching-setup packet through the first communication path 31 (S36).

Next, operation examples of the communication terminals 10 and 20 illustrated in FIGS. 2 and 3 will be described as operation examples in the corresponding control patterns for the communication system 100.

Figure 4:
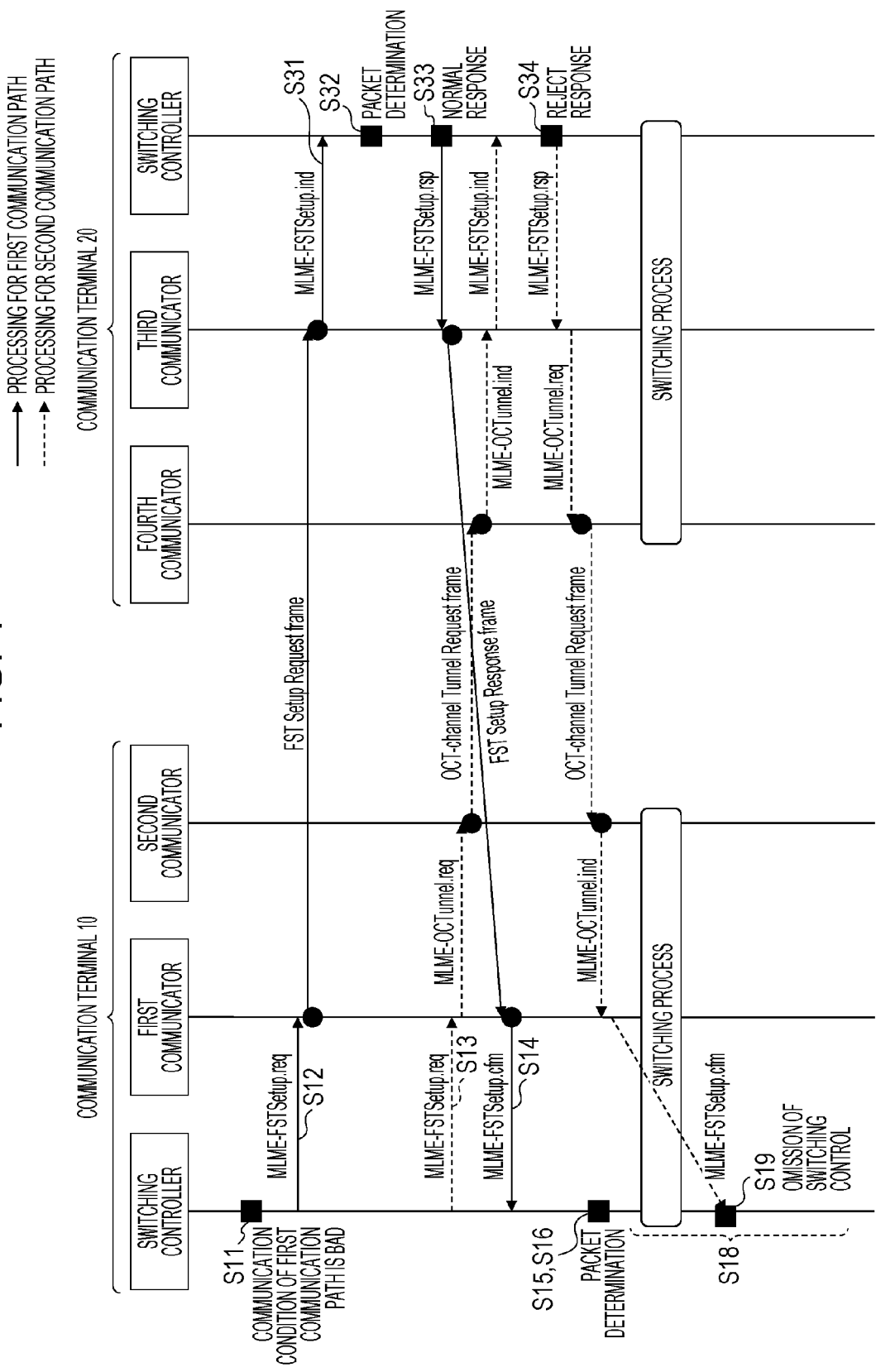
FIG. 4 is a sequence diagram illustrating an operation example in a first control pattern for the communication terminals in the embodiment.
Figure 5:
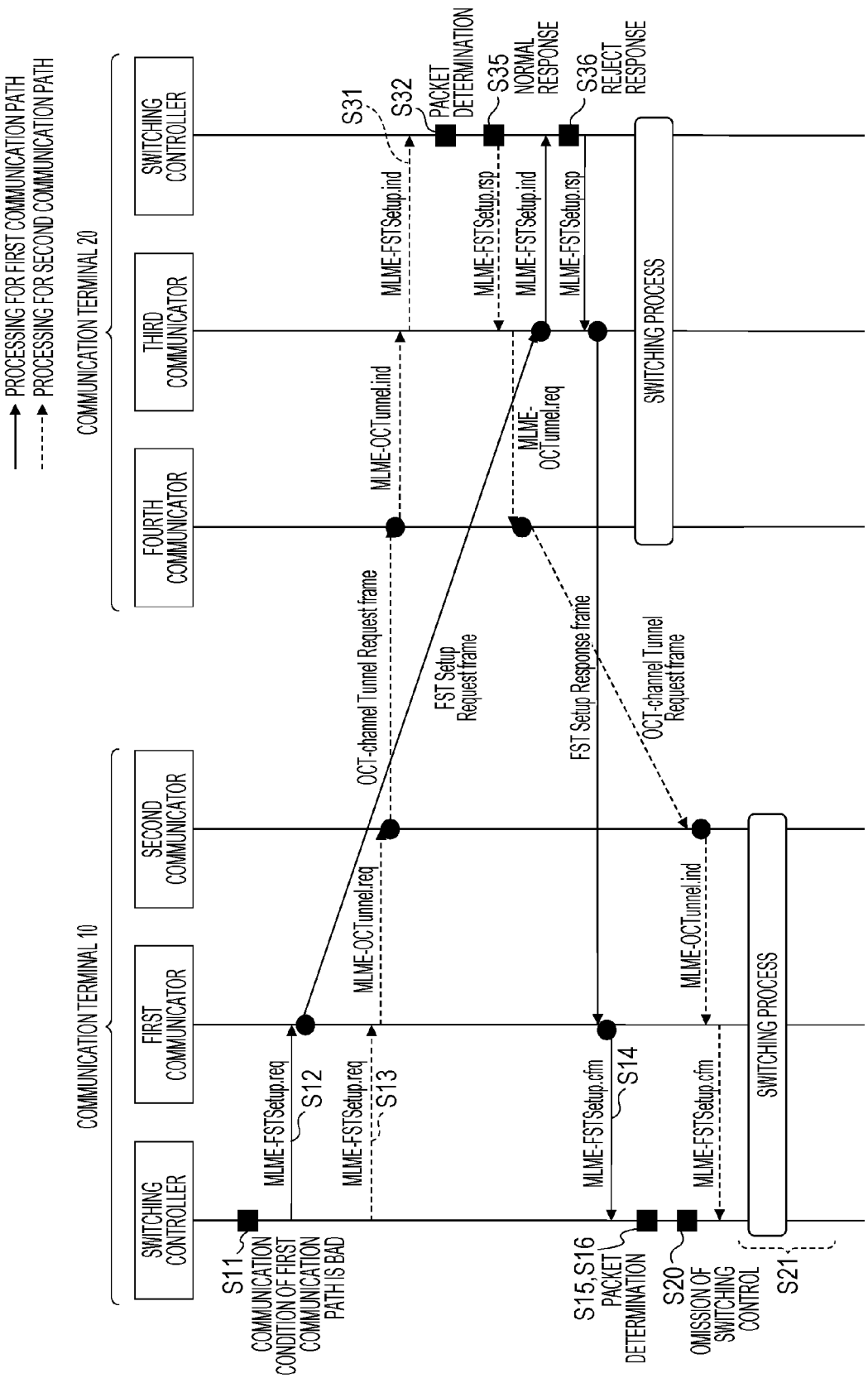
FIG. 5 is a sequence diagram illustrating an operation example in a second control pattern for the communication terminals in the embodiment.
Figure 6:
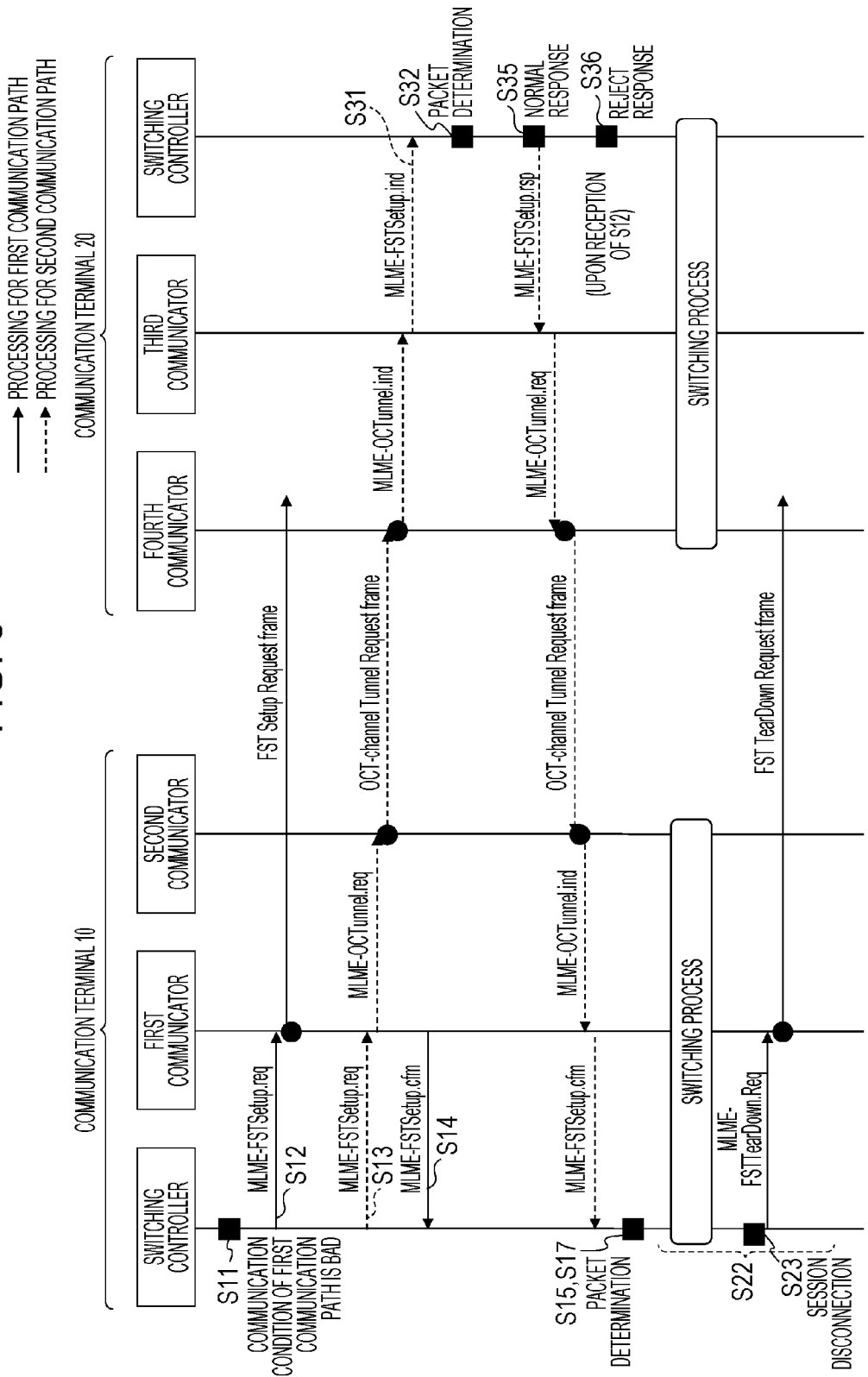
FIG. 6 is a sequence diagram illustrating an operation example in a third control pattern for the communication terminals in the embodiment.
Figure 7:
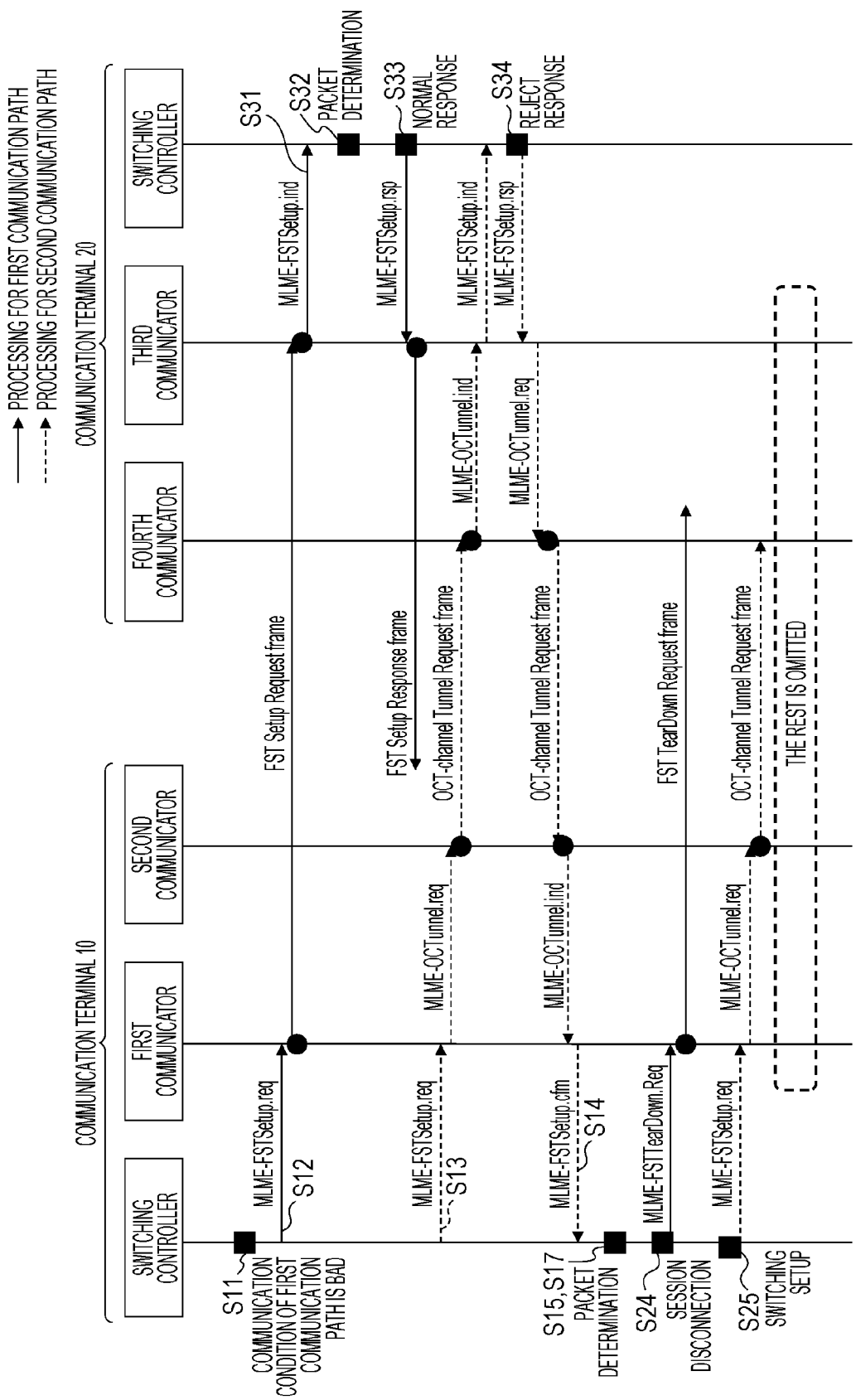
FIG. 7 is a sequence diagram illustrating an operation example in a fourth control pattern for the communication terminals in the embodiment.

FIG. 4 is a sequence diagram illustrating an operation example in the first control pattern for the communication system 100. FIG. 5 is a sequence diagram illustrating an operation example in the second control pattern for the communication system 100. FIG. 6 is a sequence diagram illustrating an operation example in the third control pattern for the communication system 100. FIG. 7 is a sequence diagram illustrating an operation example in the fourth control pattern for the communication system 100. The same steps numbers as those in FIG. 2 are given as step numbers for the corresponding processes in FIGS. 4 to 7.

In the third control pattern illustrated in FIG. 6, since the communication terminal 20 receives the switching-setup packet (S12) through the first communication path 31 later than receiving the switching-setup packet (S13) through the second communication path 32 (S31), the switching controller 23 transmits a reject response (S36).

The switching controller 23 does not return a response packet when the switching-setup packet (S12) through the first communication path 31 has not been received.

There is also the possibility that the session-disconnect packet that the communication terminal 10 transmits in step S23 does not arrive at the communication terminal 20, in which case, the communication terminal 10 may disconnect the communication session with the first communication path 31.

Since the switching controller 23 in the communication terminal 20 has received the switching-setup packet (S13) through the second communication path 32 (S31), the switching controller 23 returns a reject response (S36) as a response to the switching-setup packet (S12) received through the first communication path 31, that is, returns an invalid response. As a result, a mismatch between the the condition of the communication terminal 10 and the condition of the condition of the communication terminal 20 does not occur.

In the fourth pattern illustrated in FIG. 7, since the communication terminal 20 receives the switching-setup packet (S12) through the first communication path 31 resulting in the normal response (S33), the switching control in the communication terminal 20 is continued. Thus, it is preferable that the communication terminal 10 perform session disconnection (S24) to disconnect a communication session established through the first communication path 31.

However, since the communication condition of the first communication path 31 is bad, whether or not the session-disconnect packet (S24) arrives at the communication terminal 20 is unknown.

Thus, even when the communication terminal 10 re-transmits the switching-setup packet through the second communication path 32 (S25) because it does not receive a normal response, the communication terminal 20 returns a reject response because it has returned the normal response through the first communication path 31 in step S33.

Through the above-described processing, the communication terminal 10 repeats the processes in steps S24 and S25 until receiving a normal response through the second communication path 32. The expression "until receiving a normal response through the second communication path 32" corresponds to, for example, a period of time from when a communication session through the first communication path 31 is suspended until the switching process is started through the second communication path 32.

Thus, upon receiving the session-disconnect packet (S24) through the first communication path 31 or not having received the switching confirmation packet for a predetermined amount of time, the communication terminal 20 returns to its initial state. Accordingly, the communication terminal 20 can return a normal response to a new switching-setup packet.

Thus, the communication terminal 10 repeats the processes in steps S24 and S25 to thereby make it possible to receive, from the communication terminal 20, a normal response to the switching-setup packet.

As described above, in the communication path switching, the communication terminal 10 sequentially transmits the switching-setup packets to the communication terminal 20 through the plurality of communication paths 31 and 32, and performs switching control on the basis of the bidirectional arrival orders, that is, the first arrival order and the second arrival order. The first arrival order is the order in which switching-setup packets arrive at the communication terminal 20. The second arrival order is the order in which response (reply) packets for the switching-setup packets arrive from the communication terminal 20.

Since the switching process through the first communication path 31 is thought to be performed at the highest speed when the switching time is mainly taken into account, it is preferable that the switching processes be completed using the first control pattern. However, even with any of the second to fourth control patterns, it is possible to execute appropriate switching processes, considering various communication conditions of the first communication path 31 and the second communication path 32.

For example, when the communication condition of the first communication path 31 is bad, the switching process can be complemented through data communication through the second communication path 32. The communication speed in the second communication path 32 is lower than the communication speed of the first communication path 31, however, the communication condition of the second communication path 32 may also become bad, since it is a path for wireless communication.

Even in such a case, it is possible to perform a switching process through the first communication path 31.

Also, even when the communication terminal 20 does not support OCT it can quickly perform the switching process through the first communication path 31, since the switching-setup packets are transmitted through the first communication path 31 and the second communication path 32 at substantially the same time.

According to the communication system 100, the communication paths 31 and 32 can be switched between the communication terminals 10 and 20 that support FST, regardless of the condition of the communication path from which the switching is to be performed. Also, since the plurality of switching-setup packets are transmitted through the communication paths 31 and 32 sequentially (e.g., at substantially the same time), the waiting in the STT period can be omitted, and the communication paths can be switched at high speed. In addition, since the control pattern for the switching control is selected in accordance with various communication path conditions, it is possible to improve the accuracy of switching the communication path.

Also, through use of FST, the communication terminal 10 can perform communication, for example, by using a frequency band of 5 GHz, even in a state in which it is difficult to perform communication using a frequency band of 60 GHz. Additionally, through use of OCT, the communication terminal 10 can exchange packets by using the frequency of the communication path to which the switching is to be performed is to be switched and can improve the accuracy of switching the communication path.

Although a communication path for millimeter wave communication (a band of 60 GHz) and a communication path for IEEE802.11n (a band of 5 GHz) have been described as a plurality of communication paths in the above embodiment, it can be easily envisaged that the present disclosure is applicable to a combination of communication paths for which FST can be used.

Additionally, it is apparent to those skilled in the art that various changes and modifications can be conceived within the scope recited in the claims, and it is to be understood that such changes and modifications also naturally belong to the technical scope of the present disclosure.

In the embodiment described above, the description has been given of an example in which the communication system 100 has a configuration including one or more communication terminals 10 and one or more communication terminals 20. The communication system 100 may have a configuration including a plurality of communication terminals 10 and not including the communication terminal 20.

In the embodiment described above, the description has been given of an example in which the communication terminal 10 performs a switching process through the communication path in response to a response returned earlier. The communication terminal 10 may also perform a switching process by giving priority to a response received later, for example, if a time difference between the time at which the response is received through the first communication path 31 and the time at which the response is received through the second communication path 32 is within a predetermined time and a predetermined policy is satisfied.

In the embodiment, a terminal at a receiving end (e.g., the communication terminal 20) does not necessarily have to support FST or OCT. Thus, it is possible to enhance the degree of freedom and the degree of applicability for general use of the terminal at the receiving end.

In the above embodiment, although a description has been given of an example in which two communication paths exist between the communication terminals 10 and 20, three or more communication paths may exist. The number of communication paths whose communication states are monitored by the communication-path monitor 16 may be two or more. The communication paths to be monitored by the communication-path monitor 16 are, for example, communication paths in which the communication characteristics are likely to change. Examples of the communication paths in which the communication characteristics are likely to change include a communication path using a millimeter wave band that has a characteristic of traveling straight and that is susceptible to an influence of the human body and a communication path that is used by a large number of communication terminals and that has a low expectation value of throughput. The switching controller 15 may also perform control so as to select a stable communication path of a plurality of communication paths in a stepwise manner to perform switching.

Although the description in the above embodiment has mainly been given of an example of the packet communication between the communication terminals 10 and 20, the communication may also be data communication (e.g., frame communication) other than the packet communication.

Although the description in the above embodiment has been given of an example in which the present disclosure is implemented by hardware, the present disclosure may also be realized by software in cooperation with hardware.

The functional blocks used in the description in the above embodiment are typically realized as a large-scale integration (LSI) circuit. The functional blocks may be individually integrated into a single chip or at least one or all of the functional blocks may be integrated into a single chip. The functional blocks may be called an LSI, or may be called an integrated circuit (IC), a system LSI, a super LSI, or an ultra LSI depending on the difference of the degree of integration.

A scheme for integrating the functional blocks into an integrated circuit is not a limited to a scheme used for LSI and may be realized with a dedicated circuit or a general-purpose processor. For example, the functional blocks can also be implemented using a field programmable gate array (FPGA) that can be programmed after manufacture of an LSI circuit, connections of circuit cells in an LSI, or a reconfigurable processor that can reconfigure settings.

In addition, when a technology for circuit integration that replaces LSI becomes available with advancement of the semiconductor technology or another derivative technology, such a technology may also naturally be used to integrate the functional blocks. For example, biotechnology is applicable to the integration.

(Overview of Technology According to Present Disclosure)

A first communication terminal according to the present disclosure includes:

a first communicator that communicates with another communication apparatus through a first communication path;

a second communicator that communicates with the other communication apparatus through a second communication path;

a communication-path monitor that monitors a condition of a communication through the first communicator;

a switching-setup-packet generator that sequentially generates switching-setup packets to be transmitted through the first communicator and the second communicator, when packet loss occurs in the communication through the first communicator; and a switching controller that controls a switching control between the communication through the first communicator and a communication through the second communicator, based on a type of which response data for the switching-setup packets arrive from the other communication apparatus and an order in which the response data for the switching setup packets arrive from the other communication apparatus.

A second communication terminal according to the present disclosure is the first communication terminal;

the first communicator communicates by using a frequency band of 60 GHz, and the second communicator communicates by using a frequency band of 2.4 GHz or 5 GHz.

A third communication terminal according to the present disclosure is the first or second communication terminal; and the switching controller uses Fast Session Transfer (FST) as a switching protocol for switching between the communication through the first communicator and the communication through the second communicator.

A fourth communication terminal according to the present disclosure is the third communication terminal; and the switching controller communicates a switching-control packet based on the FST with the second communicator by using on-channel tunneling (OCT).

A fifth communication terminal according to the present disclosure is one of the first to fourth communication terminals;

the first communicator receives, from the other communication apparatus, a first response packet for at least one of the switching-setup packets, and when the first response packet indicates a response for reception success, the switching controller continues the switching control between the communication through the first communicator and the communication through the second communicator.

A sixth communication terminal according to the present disclosure is the fifth communication terminal; and when the second communicator receives, from the other communication apparatus, a second response packet for at least one of the switching-setup packets after receiving the first response packet, the switching controller omits transmission control for the second response packet.

A seventh communication terminal according to the present disclosure is one of the first to fourth communication terminals;

the first communicator receives, from the other communication apparatus, a first response packet for at least one of the switching-setup packets, and when the first response packet indicates a reject response, the switching controller omits transmission control for the first response packet; and after receiving the first response packet that indicates a reject response, the second communicator receives, from the other communication apparatus, a second response packet for at least one of the switching-setup packets, and when the second response packet indicates a response for reception success, the switching controller continues the switching control.

An eighth communication terminal according to the present disclosure is one of the first to fourth communication terminals;

the second communicator receives, from the other communication apparatus, a second response packet for at least one of the switching-setup packets, and when the second response packet indicates a response for reception success, the switching controller continues the switching control.

A ninth communication terminal according to the present disclosure is the eighth communication terminal;

the first communicator transmits, to the other communication apparatus, a session-disconnect packet for disconnecting a communication session, and the switching controller suspends to switch the communication through the first communicator.

A tenth communication terminal according to the present disclosure is one of the first to fourth communication terminals;

the second communicator receives, from the other communication apparatus, a second response packet for at least one of the switching-setup packets; and when the switching controller determines that the second response packet indicates a reject response, the first communicator transmits a session-disconnect packet, and the switching controller suspends to switch communication through the first communicator, and the second communicator re-transmits a switching-setup packet, and the switching controller continues the switching control according to a response for reception success of the re-transmitted switching-setup packet.

A communication method according to the present disclosure is a communication method for a communication apparatus and includes:

communicating with another communication apparatus through a first communicator;

communicating with the other communication apparatus through a second communicator;

monitoring a condition of a communication through the first communicator;

sequentially generating switching-setup packets to be transmitted through the first communicator and the second communicator, when the communication through the first communicator is a bad condition; and controlling a switching control between the communication through the first communicator and a communication through the second communicator, based on a type of which response data for the switching-setup packets arrive from the other communication apparatus and an order in which the response data for the switching setup packets arrive from the other communication apparatus.

The present disclosure is useful for a communication terminal and a communication method that can enhance the accuracy of switching a communication path.

What is claimed is:

1. A communication apparatus, comprising:
    a first communicator that communicates with another communication apparatus through a first communication path;
    a second communicator that communicates with the other communication apparatus through a second communication path;
    a communication-path monitor that monitors a condition of a communication through the first communicator;
    a switching-setup-packet generator that sequentially generates switching-setup packets to be transmitted through the first communicator and the second communicator, when packet loss occurs in the communication through the first communicator; and
    a switching controller that controls a switching control between the communication through the first communicator and a communication through the second communicator, based on a type of which response data for the switching-setup packets arrive from the other communication apparatus and an order in which the response data for the switching setup packets arrive from the other communication apparatus.

2. The communication apparatus according to claim 1,
    wherein the first communicator communicates by using a frequency band of 60 GHz, and
    the second communicator communicates by using a frequency band of 2.4 GHz or 5 GHz.

3. The communication apparatus according to claim 1,
    wherein the switching controller uses Fast Session Transfer (FST) as a switching protocol for switching between the communication through the first communicator and the communication through the second communicator.

4. The communication apparatus according to claim 3,
    wherein the switching controller communicates a switching-control packet based on the FST with the second communicator by using on-channel tunneling (OCT).

5. The communication apparatus according to claim 1,
    wherein the first communicator receives, from the other communication apparatus, a first response packet for at least one of the switching-setup packets, and when the first response packet indicates a response for reception success, the switching controller continues the switching control between the communication through the first communicator and the communication through the second communicator.

6. The communication apparatus according to claim 5,
    wherein, when the second communicator receives, from the other communication apparatus, a second response packet for at least one of the switching-setup packets after receiving the first response packet, the switching controller omits transmission control for the second response packet.

7. The communication apparatus according to claim 1,
    wherein the first communicator receives, from the other communication apparatus, a first response packet for at least one of the switching-setup packets, and when the first response packet indicates a reject response, the switching controller omits transmission control for the first response packet; and
    after receiving the first response packet that indicates a reject response, the second communicator receives, from the other communication apparatus, a second response packet for at least one of the switching-setup packets, and when the second response packet indicates a response for reception success, the switching controller continues the switching control.

8. The communication apparatus according to claim 1,
    wherein the second communicator receives, from the other communication apparatus, a second response packet for at least one of the switching-setup packets, and when the second response packet indicates a response for reception success, the switching controller continues the switching control.

9. The communication apparatus according to claim 8,
    wherein the first communicator transmits, to the other communication apparatus, a session-disconnect packet for disconnecting a communication session, and the switching controller suspends to switch the communication through the first communicator.

10. The communication apparatus according to claim 1,
    wherein the second communicator receives, from the other communication apparatus, a second response packet for at least one of the switching-setup packets; and
    when the switching controller determines that the second response packet indicates a reject response,
        the first communicator transmits a session-disconnect packet, and the switching controller suspends to switch communication through the first communicator, and
        the second communicator re-transmits a switching-setup packet, and the switching controller continues the switching control according to a response for reception success of the re-transmitted switching-setup packet.

11. A communication method for a communication apparatus, the method comprising:
    communicating with another communication apparatus through a first communicator;
    communicating with the other communication apparatus through a second communicator;
    monitoring a condition of a communication through the first communicator;
    sequentially generating switching-setup packets to be transmitted through the first communicator and the second communicator, when the communication through the first communicator is a bad condition; and
    controlling a switching control between the communication through the first communicator and a communication through the second communicator, based on a type of which response data for the switching-setup packets arrive from the other communication apparatus and an order in which the response data for the switching setup packets arrive from the other communication apparatus.

* * * * *